United States Patent [19]

Barthelemy

[11] Patent Number: 5,206,338
[45] Date of Patent: Apr. 27, 1993

[54] N,N'-BIS(MALEIMIDE)/HINDERED DIAMINE COPOLYMERIZATE

[75] Inventor: Pascal Barthelemy, Lyon, France

[73] Assignee: Ciba-Geigy Corporation, Ardsley, N.Y.

[21] Appl. No.: 790,023

[22] Filed: Nov. 5, 1991

Related U.S. Application Data

[63] Continuation of Ser. No. 497,721, Mar. 2, 1990, abandoned, which is a continuation of Ser. No. 134,068, Dec. 17, 1987, abandoned.

[30] Foreign Application Priority Data

Dec. 17, 1986 [FR] France .................. 86/17918

[51] Int. Cl.$^5$ .............................. C08G 73/12
[52] U.S. Cl. ..................... 528/322; 528/170; 528/314
[58] Field of Search ............ 528/322, 314, 170

[56] References Cited

U.S. PATENT DOCUMENTS

| 4,035,345 | 7/1977 | Ducloux et al. | 528/322 |
| 4,435,560 | 3/1984 | Takahashi et al. | 528/322 |
| 4,777,237 | 10/1988 | Dien et al. | 528/322 |

Primary Examiner—Harold D. Anderson
Attorney, Agent, or Firm—William A. Teoli, Jr.; JoAnn Villamizar

[57] ABSTRACT

Novel imido copolymers having improved thermal properties and well adapted for the production, e.g., of molded and cellular shaped articles, and laminates, are formed from (a) at least one N,N'-bis(maleimide), (b) at least one hindered diprimary diamine, e.g., of 4,4'-diamino-3,3',5,5'-tetraalkyldiphenylmethane or 1,3- or 1,4-(diamino)trialkylbenzene type, and, optionally, either (c$_1$) at least one N-[(meth)allyloxyphenyl]maleimide or (c$_2$) admixture of at least one N-[(meth)allyloxyphenyl]maleimide with at least one N-[(meth)allyloxymono/di(meth)allylphenyl]maleimide.

15 Claims, No Drawings

N,N'-BIS(MALEIMIDE)/HINDERED DIAMINE COPOLYMERIZATE

This application is a continuation, of Application Ser. No. 07/497,721, filed Mar. 2, 1990, now abandoned, which is a continuation, of application Ser. No. 134,068, filed Dec. 17, 1987, now abandoned.

CROSS-REFERENCE TO RELATED APPLICATIONS

Copending applications, Ser. No. 06/880,838, filed Jul. 1, 1986, Ser. No. 134,043, and Ser. No. 134,088, the latter two filed concurrently herewith and all assigned to the assignee hereof.

BACKGROUND OF THE INVENTION

1. Field of the Invention

The present invention relates to novel heat resistant polymers, and, more especially, to novel imido copolymers comprising the copolymerizate of at least one bis(imide) and at least one hindered diprimary diamine.

2. Description of the Prior Art

Polymers produced by reaction between an N,N'-bis(imide) of an unsaturated dicarboxylic acid such as, for example, an N,N'-bis(maleimide), with a diprimary diamine have been described to this art, e.g., in French Patent No. 1,555,564. The amounts of N,N'-bis(imide) and diamine are selected such that the ratio:

$$\frac{\text{number of moles of bis(imide)}}{\text{number of moles of diamine}}$$

is at least equal to 1; moreover, it is generally preferable that it should be less than 50. Heat resistant resins are thus produced, which withstand severe thermal stresses exceptionally well.

It is also disclosed in the aforesaid French patent that the preparation of these resins can be carried out in bulk by heating the reactants, after intimate mixing thereof, or, alternatively, in an inert polar diluent such as dimethylformamide, N-methyl-pyrrolidone or dimethylacetamide. The latter process is applicable, for example, when the polymer is to be used in the form of a solution.

Finally, it is noted that, for many uses, it is advantageous to carry out the preparation in two stages; in a first stage, a prepolymer is prepared by heating the intimate mixture of the two reactants to a temperature on the order of 100° to 250° C. The prepolymer obtained may be used in the state of a solution, suspension or powder, or may, alternatively, be further shaped by simple hot casting. In a second stage, the curing of the prepolymer is effected by heating to temperatures on the order of 300° C., optionally under pressure.

These polymers may be converted into films or into multicellular materials. They are of very special value for the production of molded shaped articles, optionally in combination with fibrous or pulverulent fillers, or of laminates based on inorganic fibers (simple fibers, fabric or bonded fibrous web) such as, for example, carbon, boron or glass fibers. However, the preparation and use of these polymers require precautions to be taken from the standpoint of health and hygiene, when the diprimary diamine employed is aromatic in nature, on account of the toxicity of certain of these.

SUMMARY OF THE INVENTION

Accordingly, a major object of the present invention is the provision of novel imido copolymers comprised of certain aromatic diamines which are conspicuously devoid of those toxicity hazards to date characterizing the state of this art.

Briefly, the present invention features novel imido copolymers comprising the copolymerizate, at a temperature ranging from 50° C. to 300° C., of:

(a) at least one N,N'-bis(imide) having the formula:

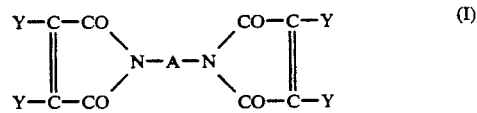

in which the symbols Y, which may be identical or different, are each H, CH$_3$ or Cl; the symbol A is a divalent hydrocarbyl radical selected from among the cyclohexylenes; phenylenes; 4-methyl-1,3-phenylene; 2-methyl-1,3-phenylene 5-methyl-1,3-phenylene; 2,5-diethyl-3-methyl-1,4-phenylene; or a radical of the formula:

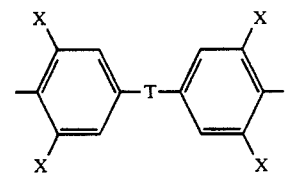

in which T is a single valence bond or a group or atom below:

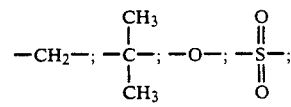

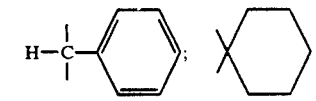

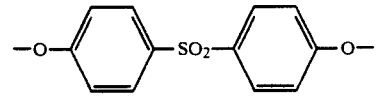

and the symbols X, which may be identical or different, are each a hydrogen atom or a methyl, ethyl or isopropyl radical; with (b) at least one hindered diprimary diamine having one of the following formulae (II) or (III):

(i) a compound having the general formula:

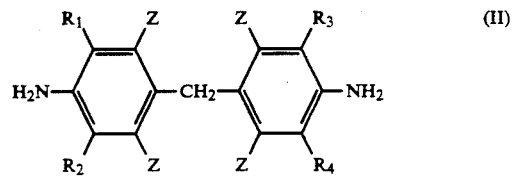

in which the symbols R$_1$, R$_2$, R$_3$ and R$_4$, which may be identical or different, are each a methyl, ethyl, propyl or isopropyl radical; and the symbols Z, which may be identical or different, are each a hydrogen atom or a chlorine atom; and (ii) a compound having the general formula:

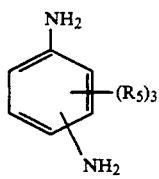
(III)

in which the amino radicals are in the meta or para position relative to each other; and the symbols R5, which are identical or different, are each a methyl, ethyl, propyl or isopropyl radical; with (c) optionally, at least one comonomer other than a bis(imide) of formula (I) and containing one or more copolymerizable carbon-carbon double bonds; and with (d) optionally, an imidazole compound.

DETAILED DESCRIPTION OF THE PREFERRED EMBODIMENTS OF THE INVENTION

More particularly according to the present invention, exemplary of the bis(imides) of formula (I), particularly representative are:

N,N'-(meta-phenylene)bis(maleimide),
N,N'-(para-phenylene)bis(maleimide),
N,N'-(4,4'-diphenylmethane)bis(maleimide),
N,N'-(4,4'-diphenyl ether)bis(maleimide),
N,N'-(4,4'-diphenyl sulfone)bis(maleimide),
N,N'-(1,4-cyclohexylene)bis(maleimide),
N,N'-[4,4'-(1,1-diphenylcyclohexane)]-bis(maleimide),
N,N'-[4,4'-(2,2-diphenylpropane)]bis(maleimide),
N,N'-(4,4'triphenylmethane)bis(maleimide),
N,N'-(2-methyl-1,3-phenylene)bis(maleimide),
N,N'-(4-methyl-1,3-phenylene)bis(maleimide),
N,N'-5-N,N'-(5-methyl-1,3-phenylene)bis(maleimide).

These bis(maleimides) may be prepared according to the processes described in U.S. Pat. No. 3,018,290 and British Patent No. 1,137,290. In a preferred embodiment of the present invention, N,N'-(4,4'-diphenylmethane)-bis(maleimide) is used, either alone or admixed with N,N'-(2-methyl-1,3-phenylene)bis(maleimide), N,N'-(4-methyl-1,3-phenylene)bis(maleimide) and/or N,N'-(5-methyl-1,3-phenylene)bis(maleimide).

Exemplary of the hindered diprimary diamines of formulae (II) and (III), the following are particularly representative:

4,4'-diamino-3,3',5,5'-tetramethyldiphenylmethane,
4,4'-diamino-3,3',5,5'-tetraethyldiphenylmethane,
4,4'-diamino-3,5-dimethyl-3',5'diethyldiphenylmethane,
4,4'-diamino-3,3'-diethyl-5,5'-dimethyldiphenylmethane,
4,4'-diamino-3,3',5,5'-tetraisopropyldiphenylmethane,
4,4'-diamino-3,3'-diisopropyl-5,5'-dimethyldiphenylmethane,
4,4'-diamino-2,2'-dichloro-3,3',5,5'-tetraethyldiphenylmethane,
1,3-diamino-2,4-diethyl-6-methylbenzene,
1,3-diamino-2-methyl-4,6-diethylbenzene, and mixtures thereof.

These hindered diamines may be prepared according to the processes described in British Patent No. 852,651 and U.S. Pat. No. 3,481,900. In a preferred embodiment of the present invention, 4,4'-diamino-3,3',5,5'-tetraethyldiphenylmethane, 4,4'-diamino-3,3'-diethyl-5,5'-dimethyldiphenylmethane, and mixtures thereof, are used.

The amounts of N,N'-bis(imide)(s) (a) and hindered diamine(s) (b) are advantageously selected such that the ratio r:

$$\frac{\text{number of moles of bis(imide)(s) }(a)}{\text{number of moles of diamine(s) }(b)}$$

ranges from 1.1:1 to 20:1, and preferably from 2:1 to 5:1.

The steric hindrance of the diamines according to the invention imparts a low reactivity to the constituents of the polymerization reaction medium, thereby enabling gelling of the prepolymers to be achieved and the complete curing of the resins after longer periods than those observed with the polyamides according to French Patent No. 1,555,564, in particular those derived from N,N'-(4,4'-diphenylmethane)bis(maleimide) and 4,4'-diaminodiphenylmethane. This lower reactivity of the constituents of the polymerization reaction medium according to the present invention may be of particular value for the production of molded parts by casting the prepolymers, for the production of parts according to filament winding technique and, finally, for carrying out the so-called hot melt coating method. The viscosities obtained for the prepolymers in the molten state are completely acceptable for transformers, and the changes occurring therein upon passage of time are slight.

Moreover, with particular respect to the polyimides obtained according to French Patent No. 1,555,564 by heating, in particular, N,N'-(4,4'-diphenylmethane)bis(maleimide) and 4,4'-diaminodiphenylmethane, it has unexpectedly been found that the choice of hindered diamines according to the present invention enables production of cured polymers, the flexural modulus of which in the heated state is preserved equally well and possibly even better.

It may be advantageous in certain instances to modify the polymers according to the present invention by including an additional copolymerizable reactant (c), for example, when it is desired to lessen the fluidity of the polymerization reaction medium. Exemplary of such optional comonomer (c), the following are particularly representative:

(c₁) at least one comonomer of the formula:

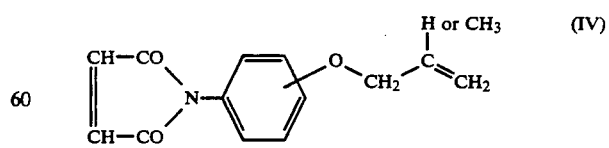
(IV)

in which the allyloxy or methallyloxy radical is in the ortho, meta or para position relative to the carbon atom of the benzene ring bonded to the nitrogen atom; or (c₂) a composition comprising admixture of:

(i) at least one comonomer of the formula:

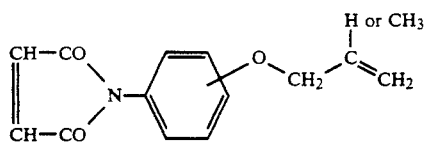
(IV)

in which the allyloxy or methallyloxy radical is in the ortho, meta or para position relative to the carbon atom of the benzene ring bonded to the nitrogen atom, with:

(ii) at least one mono-(meth)allylated comonomer having the formula:

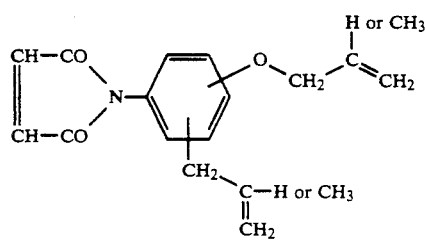
(V)

and, optionally, with (iii) at least one di-(meth)allylated comonomer having the formula:

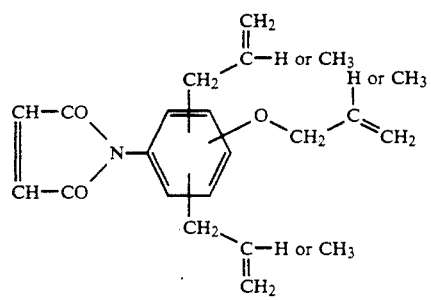
(VI)

In the aforesaid comonomer comprising the admixture (c₂), the proportions of the various constituents of the mixture of the compounds of formulae (IV), (V) and optionally (VI) may vary over wide limits. Advantageously, the proportions of the constituents are selected from between the following limits (expressed as percentages by weight of each of the constituents in the mixture):

(1) at least 30%, and preferably from 50% to 80%, of N-(meth)allyloxyphenylmaleimide of formula (IV);

(2) from 5% to 50%, and preferably from 10% to 35%, of the mono-(meth)allylated compound(s) of formula (V); and (3) from 0% to 20%, and preferably from 0% to 15% of the di-(meth)allylated compound(s) of formula (VI), with the proviso that the sum of the constituents having in each mixture is equal to 100% by weight.

When it is desired, for example, to further improve the flexural properties in the heated state, at least one substituted heterocyclic compound (c₃) is included.

Exemplary of the optional reactant (c₁), representative are:

N-(2-allyloxyphenyl)maleimide,
N-(3-allyloxyphenyl)maleimide,
N-(4-allyloxyphenyl)maleimide,
N-(2-methallyloxyphenyl)maleimide,
N-(3-methallyloxyphenyl)maleimide,
N-(4-methallyloxyphenyl)maleimide,
and mixtures thereof.

The maleimides of formula (IV) are conveniently prepared, in particular, from aminophenols (ortho-, meta- or para-), according to the Claisen reaction. For example, an aminophenol (the amine group of which is first blocked by reaction with acetic anhydride to form acetamidophenol) can be reacted with an allyl halide (most frequently the bromide) or methallyl halide, as the case may be, dissolved in acetone and in the presence of dipotassium carbonate. The amine group is then regenerated by hydrolysis.

The corresponding maleimide is then prepared in conventional manner by reacting, in solution, the allyloxyaniline or methallyloxyaniline obtained above with maleic anhydride in the presence of acetic anhydride, triethylamine and a nickel salt (nickel acetate in particular).

N-allylloxyphenylmeleimide or N-methallyloxyphenylmaleimide is thus produced.

N-(4-allyloxyphenyl)maleimide is a mustard yellow solid having a melting point of approximately 103° C.

The NMR analysis is in agreement with the following structure:

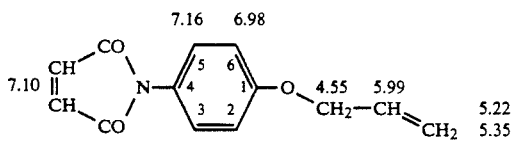

¹H NMR; solvent: DMSO d6; reference: hexamethyldisiloxane (HMDS):

7.16 (2H,m): H 3.5;
7.10 (2H,s): maleimido;
6.98 (2H,m): H 2.6;
5.99 (1H,m): —CH=;
5.35 and 5.22 (2H,dd): =CH₂;
4.55 (2H,d): OCH₂.

N-(3-allyloxyphenyl)maleimide is a viscous orange-yellow liquid which crystallizes slowly at ambient temperature and which boils at approximately 150° C. at a pressure of 20 Pa.

NMR analysis is in agreement with the following structure:

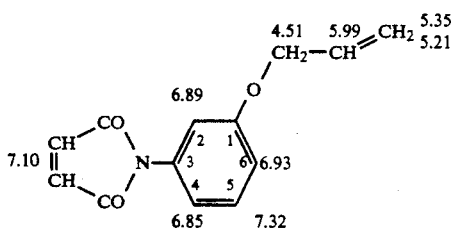

¹H NMR; solvent: DMSO d6; reference: HMDS
6.85, 6.89 and 6.93 (3H,m): H4, H2 and H6;
7.10 (2H,s): maleimido;
7.32 (1H,t): H5;
5.99 (1H,m) —CH=;
5.35 and 5.21 (2H,dd) =CH₂;
4.51 (2H,d): OCH₂.

N-(2-allyloxyphenyl)maleimide is a pale yellow crystalline solid having a melting point of approximately 82°

C. and a boiling point of from 148° C. to 155° C. at a pressure of 20 Pa.

NMR analysis is in agreement with the following structure:

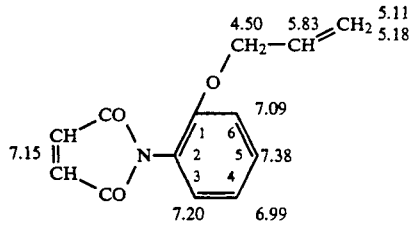

¹H NMR; solvent: DMSO d6; reference: HMDS:
7.38 (1H,dt): H5;
7.20 (1H,dd): H3;
7.15 (2H,s): maleimido;
7.09 (1H,dd): H6;
6.99 (1H,dt): H4;
5.83 (1H,m): —CH=;
5.18 and 5.11 (2H,dd): =CH₂;
4.50 (2H,d): OCH₂.

N-(4-methallyloxyphenyl)maleimide is a beige-colored solid having a melting point of 64° C.

NMR analysis is in agreement with the following structure:

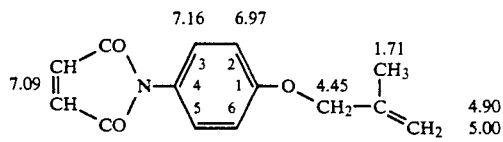

¹H NMR; solvent: DMSO d6; reference: HMDS:
7.16 (2H,d): H 3.5;
7.09 (2H,s): maleimido;
6.97 (2H,d): H 2.6;
4.90 and 5.00 (1H,s): CH₂=;
4.45 (2H,s): OCH₂;
1.71 (3H,s): CH₃.

N-(3-methallyloxyphenyl)maleimide is a beige-colored solid having a melting point of 39° C.

NMR analysis is in agreement with the following structure:

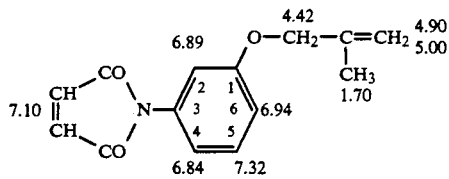

¹H NMR: solvent: DMSO d6; reference: HMDS:
7.32 (1H,t): H5;
7.10 (2H,s): maleimido;
6.94 (1H,d): H6;
6.89 ():1H,s): H2;
6.84 (1H,d): H4;
4.90 and 5.00 ():1H,s): CH₂=;
4.42 (2H,s): OCH₂;
1.70 (3H,s): CH₃.

N-(2-methallyloxyphenyl)maleimide is a beige-colored solid having a melting point of 96° C.

NMR analysis is in agreement with the following structure:

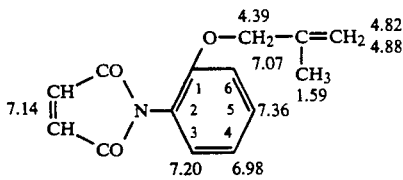

¹H NMR; solvent: DMSO d6; reference: HMDS:
7.36 (1H,t) H5;
7.20 (1H,d) H3;
7.14 (2H,s) maleimido;
7.07 (1H,d) H6;
4.82 and 4.88 (1H,s) CH₂=;
4.39 (2H,s) OCH₂;
1.59 (3H):,s) CH₃.

In a preferred embodiment of the present invention, the mixture of N-(meth)allyloxyphenylmaleimide of formula (IV) with one or more (meth)allyl-substituted derivatives of formula(e) (V) and optionally (VI) is in the form of a crude product resulting from the process described immediately hereinbelow.

This process is characterized in that it includes the following 3 stages, which are carried out in sequence in the same reactor:

(1) the first stage comprises reacting, in a solvent medium, an aminophenol with maleic anhydride, at a temperature ranging from 20° C. to 200° C., for a period of time ranging, depending on the temperature selected, from 30 minutes to 2 hours (this first stage provides a first reaction medium containing an N-(hydroxyphenyl)maleamic acid);

(2) the second stage comprises (meth)allylating the aforementioned acid by reacting said first reaction medium with a (meth)allyl halide, at a pH which must be adjusted and maintained at a constant value of from 7 to 14 by adding a defined amount of an aqueous alkaline solution, at a temperature ranging from 40° C. to 150° C., and after the acidification and removal of the aqueous phase (this second stage provides a second organic reaction medium containing an N-[(meth)allyloxyphenyl]maleamic acid, one or more N-[(meth)allyloxy(-meth)allylphenyl]maleamic acids and optionally one or more N-[(meth)allyloxydi(meth)allylphenyl]maleamic acids);

(3) the third stage comprises cyclizing the aforementioned maleamic acids by reacting said second reaction medium with an anhydride of a lower carboxylic acid, in the presence of a tertiary amine and optionally a catalyst, and then removing the reaction solvent (this third stage provides a crude reaction product which is a mixture formed from at least 30% by weight, and preferably from 50% to 80% by weight, of N-(meth)allyloxyphenylmaleimide, from 5% to 50% by weight, and preferably from 10% to 35% by weight, of one or more N-[(meth)allyloxy(meth)allylphenyl]maleimides and from 0% to 20% by weight, and preferably from 0% to 15% by weight, of one or more N-[(meth)allyloxydi(-meth)allylphenyl]maleimides.

The 3 stages described above are carried out in sequence, in a single solvent, in order to achieve greater simplicity in the process; however, it is possible to change the solvent during any particular stage without encountering difficulty. The choice of solvent is very wide; however, as the second stage is performed in an aqueous/organic two-phase medium, it may be desirable to employ a water-immiscible organic solvent which simplifies considerably the treatment of the reaction mass. Exemplary of the water-miscible or - immiscible solvents which can be used, preferred are those which dissolve the starting aminophenol under the temperature conditions selected for the synthesis. Among these solvents, representative are, for example: alcohols (such as, for example, methanol, ethanol and butanol); ketones (such as, for example, acetone, methyl ethyl ketone and methyl isobutyl ketone); nitriles (such as, for example, benzonitrile, propionitrile and acetonitrile); esters (such as, for example, ethyl acetate and butyl acetate); aromatic solvents (such as, for example, anisole and chlorobenzene); and halogenated hydrocarbons (such as, for example, chloroform, dichloromethane and dichloroethane).

With respect to the first stage of the process, the concentration of the starting reagents in the solvent is not critical. However, for productivity reasons, it is neither advisable to dilute the reaction medium too much, nor is it advisable to concentrate it too much, for reasons of ease of stirring. In this first stage, maleic anhydride is employed in quantities at least equal to one mole per mole of aminophenol; larger quantities on the order of 1.01 to 1.5 moles per mole of aminophenol are typically employed. Additionally, the temperature preferably ranges from 40° C. to 60° C.

With respect to the second stage, the amount of aqueous alkaline solution, for example, an aqueous NaOH solution, required, on the one hand, to salify the N-(hydroxyphenyl)maleamic acid and, on the other hand, to provide the desired pH, is first added to the reaction medium. The pH will be maintained constant throughout the reaction period by adding sodium hydroxide; preferentially, the pH is adjusted and maintained at a constant value of from 10 to 12. The allylation reaction is preferably carried out using (meth)allyl bromide or chloride. The quantity of (meth)allyl halide is on the order of 1.5 to 10 moles per mole of phenolic OH group and preferably on the order of 2 to 4. The excess of this reagent may be recovered at the end of the operation and recycled into a following operation. The period over which (meth)allyl halide is added is not critical and advantageously ranges from 1 hour to 5 hours and preferably from 2 hours to 4 hours. In this second stage, the temperature preferably ranges from 60° C. to 100° C. It should be noted that at the end of this stage, the aqueous phase is acidified to a pH of approximately 1 using common acids, preferably inorganic oxyacids or hydracids. The aqueous layer is removed and the organic layer remains in the reactor.

With respect to the third stage of the process, acetic anhydride is advantageously used as the lower carboxylic acid anhydride, in quantities at least equal to one mole per mole of HOOC—CH=2 CH—CO—NH— group to be cyclized. Larger quantities on the order of 1.05 to 1.5 moles per maleamic group are generally employed.

Exemplary of the tertiary amines suitable therefor, particularly representative are the trialkylamines and N,N-dialkylanilines in which the alkyl radicals contain from 1 to 12 carbon atoms. It is advantageous to employ triethylamine or N,N-dimethylaniline. The quantities of tertiary amine range from 0.05 to 2 moles per mole of HOOC—CH=CH—CO—NH— group.

Exemplary of the catalysts therefor, representative are the nickel salts of carboxylic acids, hydrated if required, and the chelated forms of such metal. The acetate and acetylacetonate are particularly well suited. These catalysts are employed in very small amounts, on the order of 0.05 to 1.5 g per mole of HOOC—CH= CH—CO—NH— group and preferably on the order to 0.1 to 0.8 g.

In this third stage, the temperature is not critical and has no effect on the reaction rate. This preferably from 60° C. to 80° C. At the end of this stage, the solvent is removed by vacuum distillation and the crude reaction product, having the appearance of an oil, is obtained.

In a very preferred embodiment of the present invention, the process described above is very suitable for the preparation, beginning with meta-aminophenol, of mixtures based on the following compounds: N-[3-(meth)allyloxyphenyl]maleimide + N-[3-(meth)allyloxy-4-(meth)allylphenyl]maleimide + N-[3-(meth)allyloxy-6-(meth)allylphenyl]maleimide +, where appropriate, N-[3-(meth)allyloxy-4,6-di(meth)allylphenyl]maleimide.

It will be appreciated that using ortho-aminophenol as the starting material results in mixtures based on the following compounds: N-[2-(meth)allyloxyphenyl]-maleimide + N-[2-(meth)allyloxy-3-(meth)allylphenyl]-maleimide + N-[2-(meth)allyloxy-5-(meth)allylphenyl]-maleimide +, where appropriate, N-[2-(meth)allyloxy-3,5-di(meth)allylphenyl]maleimide.

It will also be appreciated that using paraaminophenol as the starting material results in mixtures based on the following compounds: N-[4-(meth)allyloxyphenyl]maleimide + N-[4-(meth)allyloxy-3-(meth)allylphenyl]maleimide +, where appropriate, N-[4-(meth)allyloxy-3,5-di(meth)allylphenyl]maleimide.

As regards the optional reactant (c$_3$), this is advantageously selected from among the vinylpyridines, N-vinylpyrrolidone, allylisocyanurate and vinyltetrahydrofuran.

With respect to the amount of the optional reactant (c), this generally represents less than 60%, and preferably from 5% to 50%, of the total weight of the reactants (a) and (b).

The reactivity of the constituents (a), (b) and, where appropriate, (c), of the polymerization medium according to the invention may be increased, for example when the final applications intended require operations to be carried out on an injection molding machine, by adding an imidazole catalyst (d).

The optional imidazole compound (d) corresponds to the following general formula:

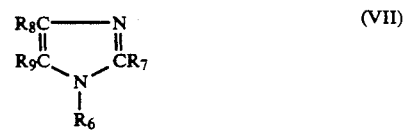
(VII)

in which $R_6$, $R_7$, $R_8$ and $R_9$, which may be identical or different, are each a hydrogen atom, an alkyl or alkoxy radical having from 1 to 20 carbon atoms, or a vinyl, phenyl or nitro radical, with the proviso that $R_8$ and $R_9$ may together form, with the carbon atoms from which they depend, a single ring member such as, for example, a benzene ring, and with the further proviso that $R_6$ may constitute a carbonyl group linked to a second such imidazole ring.

As specific example of these imidazole compounds (d), particularly representative are imidazole or glyoxaline, 1-methylimidazole, 2-methylimidazole, 1,2-dimethylimidazole, 1-vinylimidazole, 1-vinyl-2-methylimidazole, benzimidazole and carbonyldiimidazole.

The optional imidazole compound is employed in catalytic amounts. Depending on the nature of the imidazole compound and depending on the rate of polymerization desired at the stage when the reaction is carried out, the imidazole compound is employed in a proportion of from 0.01 to 1% by weight with respect to the total weight of the reactants (a)+(b) +, optionally (c), and preferably from 0.05 to 0.5% by weight.

The polymers according to the invention may be prepared by directly heating the bis(imide)(s) (a), the amino reactant (b) and, optionally, the reactant (c) with, if required the imidazole compound (d), at least until a homogeneous liquid mixture is produced. The temperature may vary according to the physical state of the compounds present, but generally ranges from 50° C. to 300° C. It is advantageous to convert the starting compounds to, and maintain them in a state of intimate admixture before and during the heating, for example using efficient stirring. When the imidazole compound (d) is employed, the latter is preferably added, at the outset, to the well-stirred mixture of the reactants (a) and (b). When this compound is particularly active, in order to avoid its encapsulation in the polymer network formed, it is desirable to add it in a solvent or diluent which is compatible with the reaction medium. It may thus be advantageous to use either the amino reactant (b) itself, or one of the polar organic liquids referred to below as a solvent or diluent.

The preparation of the polymers according to this invention may also be carried out by heating the mixture of reactants in an organic diluent which is liquid over at least part of the range 50° C.-250° C. Exemplary of such diluents, representative are, in particular, aromatic hydrocarbons such as xylenes and toluene, halogenated hydrocarbons such as chlorobenzenes, polar solvents such as dioxane, tetrahydrofuran and dibutyl oxide, dimethylformamide, dimethyl sulfoxide, N-methylpyrrolidone, dimethylacetamide, methyl glycol and methyl ethyl ketone. The solutions or suspensions of polymers may be employed as such for many applications; it is also possible to isolate the polymers, for example by filtration, where appropriate after precipitation by means of an organic diluent which is miscible with the solvent employed. In this context, it is advantageously possible to use a hydrocarbon, the boiling point of which does not substantially exceed 120° C.

It will be appreciated that the properties of the polymers according to the invention may vary widely, depending in particular on the exact nature of the reactants introduced, the proportions of reactants selected and the precise conditions of temperature adopted within the range stated above. As regards the polymers obtained, the latter may be cured polymers which are insoluble in the usual solvents such as, for example, the compounds mentioned in the preceding paragraph, and which do not exhibit significant softening below the temperature at which they begin to decompose.

However, these polymers can also be in the form of prepolymers (P) which are soluble in polar organic solvents and possess a softening point at a temperature below 200° C. (in general, this softening point is between 50° and 150° C.). These prepolymers may be obtained in bulk by heating the mixture of reactants until a homogeneous or pasty product is obtained, at a temperature generally ranging from 50° to 180° C., for a period of time which can range from a few minutes to a few hours, this period becoming shorter as the selected temperature is increased. Before the mixture of reactants is subjected to heating, it is advantageous, in this case also, to intimately mix its constituents beforehand, by stirring. In this case also, there is a preferred method for introducing the imidazole compound (d), this being the method described above in relation to the direct preparation of cured polymers. The preparation of the polymers may also be carried out in suspension, or in solution in a diluent which is liquid over at least part of the range 50°-180° C.

In cases where the optional reactant (c) is employed, it will be appreciated that these prepolymers (P) can also be obtained by forming, from the bis(imide)(s) (a) and the reactant (c), a prepolymer (PP) which is then reacted with the amino reactant (b) and, if required, the imidazole compound (d). It is also possible to prepare beforehand a prepolymer (P'P') by heating the mixture of amino reactant (b), reactant (c) and, if required, imidazole compound (d), and then reacting it with the bis(imide)(s) (a) to obtain the prepolymer (P). The conditions of temperature and time used for the preparation of the prepolymers (PP) or (P'P') and for their conversion to prepolymers (P) are those described above in relation to the preparation of the prepolymers (P), by directly mixing the reactants (a), (b) and, optionally, (c) with, if required, the imidazole compound (d).

The prepolymers (P) ma be used in the bulk liquid state, simple hot casting sufficing for shaping and producing molded articles. It is also possible, after cooling and grinding, to use them in the form of powders which are exceptionally suitable for compression molding operations, optionally in the presence of fillers in the state of powders, spheres, granules, fibers or flakes. In the form of suspensions or solutions, the prepolymers (P) may be used for producing coatings and preimpregnated intermediate articles, the reinforcement of which may consist of fibrous materials based on aluminum silicate or oxide or zirconium silicate or oxide, carbon, graphite, boron, asbestos or glass. It is also possible to use these prepolymers (P) for producing cellular materials after the incorporation of a blowing agent such as, for example, azodicarbonamide.

In a second stage, the prepolymers (P) may be cured by heating to temperatures on the order to 300° C., generally between 150° and 300° C.; and additional shaping may be performed during the curing, optionally under vacuum or under a pressure above atmospheric pressure. It is also possible that these operations can be consecutive.

In cases where the optional reactant (c) is utilized, it is also within the ambit of the invention to prepare the polymers, which are not in the form of prepolymers (P), by employing an intimate mixture of prepolymer (PP), amino reactant (b) and, if required, imidazole compound (d), or an intimate mixture of prepolymer (P'P') and bis(imide)(s) (a), which is heated in bulk under the conditions described above.

The polymers according to the invention are of value in industrial applications requiring materials exhibiting good mechanical and electrical properties, as well as great chemical inertness at temperatures of 200° to 300° C. By way of examples, they are suitable for the manufacture of insulators in plate or tubular form for electrical transformers, printed circuit bases, pinions, rings, and the like. The preimpregnated articles are useful for the production of parts having a variety of shapes and functions in many industries such as, for example, in the aeronautical industry. These parts, referred to as laminates, which may be solids of rotation, are produced by depositing several layers of prepregs on a form or support. The prepregs can also be used as reinforcements or as a means of repairing damaged parts. It is also possible to produce parts by filament winding techniques, either with or without a support. Injection molding or pultrusion operations too can be carried out. Again appreciate that, in order to shape, for example, molded articles, it is possible to use either the mixture of the reactants or a prepolymer (P) as the starting material. When the mixture of the reactants is used directly as the starting material, this mixture is shaped into the desired final article and the curing is then carried out by heating. When the prepolymer (P) is used as the starting material, it may be molded by simple hot casting or by injection molding, and its curing is then effected by heating.

In order to further illustrate the present invention and the advantages thereof, the following specific examples are given, it being understood that same are intended only as illustrative and in nowise limitative.

EXAMPLE 1

The following materials were introduced, at room temperature, into a glass reactor equipped with a side tube and an anchor type stirrer:

(i) 76 g (0.212 mole) of N,N'-(4,4'-diphenylmethane)-bis(maleimide); and (ii) 24 g (0.085 mole) of 4,4'-diamino-3,3'-diethyl-5,5'-dimethyldiphenylmethane (the ratio r being equal to 2.5:1).

The reactor was immersed in an oil bath preheated to 160° C., and the mixture permitted to react under these conditions for 45 minutes, during the last 5 of which a reduced pressure of $13.3 \times 10^2$ Pa was applied.

The reaction mass was then poured into a mold preheated to 150° C. Plates were prepared in this manner having the dimensions $140 \times 100 \times 4$ mm, which were subjected to the following curing cycle:

100 minutes at between 150° C. and 250° C.,
18 hours at 250° C.,
and 2 hours at between 250 ° C. and 25° C.

After release from the mold, the plates based on cured polymer were cut in order to obtain test pieces having the dimensions $30 \times 7 \times 4$ mm, on which the flexural breaking strength (Sf) and the flexural modulus (Mf) were measured (INSTRON apparatus with distance of 25.4 mm between supports).

By way of a comparative test, the operations described above were repeated, but using the following reactants:

(i) 147.4 g (0.412 mole) of N,N'-(4,4'-diphenylmethane)bis(maleimide); and (ii) 32.6 g (0.165 mole) of 4,4'-diaminodiphenylmethane (the ratio r was equal to 2.5:1).

These reactants were introduced over the course of 4 minutes into the reactor preheated to 160° C. The mass obtained was homogeneous. The mixture was then degassed for 1 minute and then permitted to react at 160° C. for an additional 9 minutes.

The values of the flecural properties are reported in the following Table (I):

TABLE I

| | Flexural strength (MPa) | | | | Flexural modulus (MPa) | | | |
|---|---|---|---|---|---|---|---|---|
| | Initial | | after 1,000 hr at 250° C. | | Initial | | after 1,000 hr at 250° C. | |
| | at 25° C. | at 250° C. | at 25° C. | at 250° C. | at 25° C. | at 250° C. | at 25° C. | at 250° C. |
| EX 1 | 119 | 53 | 138 | 70 | 3,120 | 1,900 | 3,400 | 2,800 |
| Test | 226 | 93.2 | 159 | 135 | 3,400 | 1,500 | 3,200 | 2,500 |

Furthermore, the gel time of the prepolymers according to Example 1 and according to the comparative test were measured. The gel time was measured in each case on 10 g of the mixture of powders of bis(imide) and diamine, using a SUNSHINE apparatus: zero time is defined by the instant of immersion of the tube containing the mixture of the powders in a thermostatic bath at the temperature of measurement. The results were as follows:

Gel time at 160° C. of the prepolymer according to Example 1: 100 minutes;

Gel time at 160° C. of the prepolymer according to the comparative test: 15 minutes.

EXAMPLES 2 TO 5

Into a glass reactor equipped with an anchor type stirrer, there were introduced, at room temperature, 1.83 g (0.006 mole) of 4,4'-diamino-3,3'-diethyl-5,5'dimethyldiphenylmethane and variable amounts of imidazole, as follows: Example 2, absence of imidazole; Example 3, 0.005 g; Example 4, 0.010 g; and Example 5, 0.015 g.

The reaction mass was homogenized over 30 seconds at 160° C. The mixture was cooled and 8.17 g (0.022 mole) of N,N'-(4,4'-diphenylmethane)bis(maleimide) were introduced (the ratio r was equal to 3.6:1). The reactor was immersed again in a bath at 160° C. and the time, measured from this instant, taken for the reaction mixture to gel, was determined on a SUNSHINE apparatus.

TABLE II

| EXAMPLE | % by weight of imidazole | Gel time at 160° C. |
|---|---|---|
| 2 | 0 | 100 min |
| 3 | 0.05 | 43 min |
| 4 | 0.10 | 22.7 min |
| 5 | 0.15 | 10.7 min |

It will thus be seen that the prepolymers according to the invention afford, depending on the level of catalyst, a wide range of reactivity, and it is possible to adjust this reactivity readily to the desired value according to the final applications intended. The prepolymers produced may hence be employed equally well for uses requiring very short reaction times (for example using an injection molding machine) and for uses requiring moderate to long reaction times (for example hot melt coating, or injection into compact reinforcements consisting of fibers interwoven in several directions).

EXAMPLE 6

19.9 g (0.64 mole) of 4,4'-diamino-3,3',5,5'-tetraethyldiphenylmethane and 0.15 g of imidazole were introduced, at room temperature, into the reactor of Example 1.

The reactor was immersed in an oil bath preheated to 160° C. and the reaction mass was homogenized for 4 minutes.

80.1 g (0.224 mole) of N,N'-(4,4'-diphenylmethane)-bis(maleimide) were then incorporated over 3 minutes (the ratio r was equal to 3.5:1). The reduced pressure of 2,600 Pa was then applied for 3 minutes. The reaction mass was permitted to react for an additional 5 minutes. The prepolymer obtained was then poured, molded, cured and tested as described above in Example 1.

Results of flexion measurements on the test pieces of cured polymer:

| at 25° C.: | Sf = 140 MPa |
| | Mf = 3,100 MPa |
| at 250° C.: | Sf = 53 MPa |
| | Mf = 2,000 MPa |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An imido polymer comprising the copolymerizate of (a) at least one N,N'-bis(maleimide), with (b) at least one hindered diprimary diamine having the general formula (II):

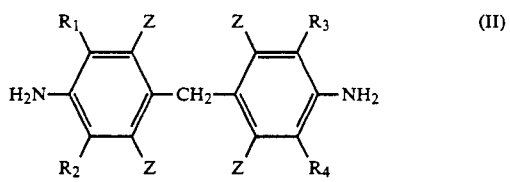
(II)

in which the symbols $R_1$, $R_2$, $R_3$ and $R_4$, which are identical or different, are each a methyl, ethyl, propyl or isopropyl radical; and the symbols Z, which are identical or different, are each a hydrogen atom or a chlorine atom; or the general formula (III):

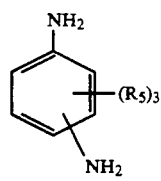
(III)

which the amino radicals are in the meta or para position relative to each other; and the symbols $R_5$, which are identical or different, are each a methyl, ethyl, propyl or isopropyl radical; and (c$_2$) an admixture of at least one N-[(meth)allyloxyphenyl]maleimide with at least one N-(meth)-allyloxy-(meth)allylphenyl]maleimide.

2. The imido polymer as defined by claim 1, said admixture (c$_2$) further comprising at least one N-[(meth)allyloxy-di(meth)allylphenyl]maleimide.

3. The imido polymer as defined by claim 1, comprising the copolymerizate of (a), (b), and (c$_2$), and (c$_3$) at least one vinylpyridine, N-vinylpyrrolidone, allylisocyanurate or vinyltetrahydrofuran.

4. A copolymerizable composition of matter comprising the components (a), (b), and (c$_2$) as defined by claim 1, and (d) a catalytically effective amount of an imidazole compound.

5. The composition of matter as defined by claim 4, said imidazole compound (d) having the general formula (VII):

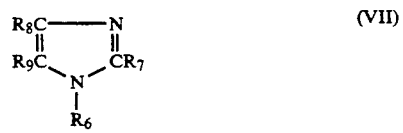
(VII)

in which $R_6$, $R_7$, $R_8$ and $R_9$, which are identical or different, are each a hydrogen atom, an alkyl or alkoxy radical having from 1 to 20 carbon atoms, or a vinyl phenyl or nitro radical, or $R_8$ and $R_9$ together form, with the carbon atoms from which they depend, a single ring member, or $R_6$ is a carbonyl imidazole ring group.

6. The imido polymer as defined by claim 1, said at least one N,N'-bis(maleimide) (a) having the general formula (I):

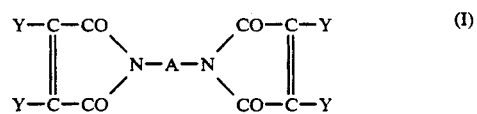
(I)

in which the symbols Y, which are identical or different, are each H, CH$_3$ or Cl; and the symbol A is a divalent hydrocarbyl radical, or a radical of the formula:

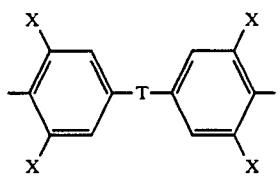

in which T is a single valence bond of T is a group or atom below:

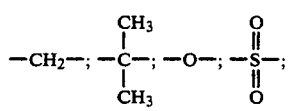

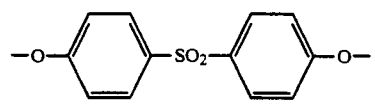

and the symbols X, which are identical or different, are each a hydrogen atom or a methyl, ethyl or isopropyl radical.

7. The imido polymer as defined by claim 6, wherein the ratio of the number of moles of the at least one N,N'-bis(maleimide) (a) to the number of moles of the at least one hindered diprimary diamine (b) ranges from 1.1:1 to 20:1.

8. The imido polymer as defined by claim 7, said ratio ranging from 2:1 to 5:1.

9. A thermosetting prepolymer of the imido polymer as defined by claim 1, soluble in polar organic solvents, and having a softening point at a temperature less than 200° C.

10. A thermosetting crosslinked prepolymer of the imido polymer as defined by claim 1.

11. A shaped article comprising the thermosetting imido polymer as defined by claim 9.

12. A shaped article comprising the thermoset imido polymer as defined by claim 10.

13. The imido polymer as defined by claim 1, said at least one N,N'-bis(maleimide) (a) comprising N,N'-(meta-phenylene)bis(maleimide); N,N'-(paradiphenylmethane)bis(maleimide); N,N'-diphenyl ether)bis(maleimide); N,N'-(4,4'-diphenyl sulfone)bis(maleimide); N,N'-(1,4-cyclohexylene)bis(maleimide); N,N'-[4,4'-(1,1-diphenylcyclohexylidene)]bis(maleimide); N,N'-[4,4'-(2,2-diphenylpropane)]bis(maleimide); N,N'-(4,4'-triphenylmethane)bis(maleimide); N,N'-(2-methyl-1,3-phenylene)bis(maleimide); N,N'-(4-methyl-1,3-phenylene)bis(maleimide); or N,N'-(5-methyl-1,3-phenylene)bis(maleimide).

14. The imido polymer as defined by claim 1, said at least one hindered diprimary diamine (b) comprising 4,4'-diamino-3,3',5,5'-tetramethyldiphenylmethane; 4,4'-diamino-3,3',5,5'-tetraethyldiphenylmethane; 4,4'-diamino-3,5-dimethyl-3',5'-diethyldiphenylmethane; 4,4'-diamino-3,3'-diethyl-5,5'-dimethyldiphenylmethane, 4,4'-diamino-3,3',5,5'-tetraisopropyldiphenylmethane, 4,4'-diamino-3,3'-diisopropyl-5,5'-dimethyldiphenylmethane; 4,4'-diamino-2,2'-dichloro-3,3',5,5'-tetraethyldiphenylmethane; 1,3-diamino-2,4-diethyl-6-methylbenzene; 1,3-diamino-2-methyl-4,6-diethylbenzene; or mixtures thereof.

15. An imido polymer comprising a copolymerizate of a comonomer reactant mixture comprising (a) at least one N,N'-bis(maleimide), and (b) at least one hindered diprimary diamine having the general formula (II):

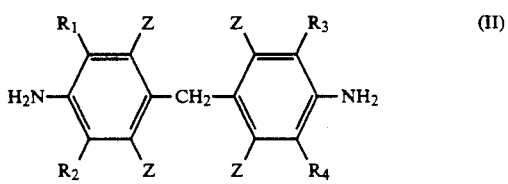

in which the symbols $R_1$, $R_2$, $R_3$ and $R_4$, which are identical or different, are each a methyl, ethyl, propyl or isopropyl radical; and the symbol Z is a chlorine atom.

* * * * *